J. C. BOGART.
DIFFERENTIAL GEARING.
APPLICATION FILED NOV. 6, 1917. RENEWED AUG. 19, 1920.
1,372,993.
Patented Mar. 29, 1921.
2 SHEETS—SHEET 2.
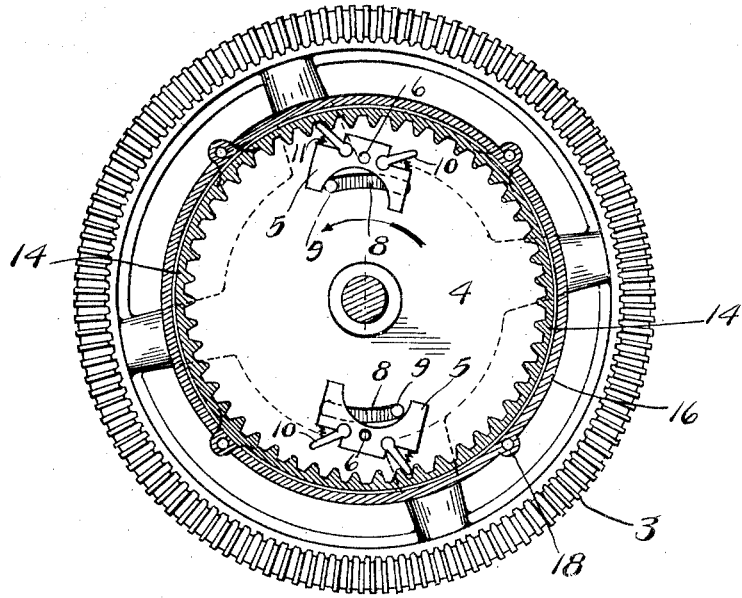
*Fig. 4.*
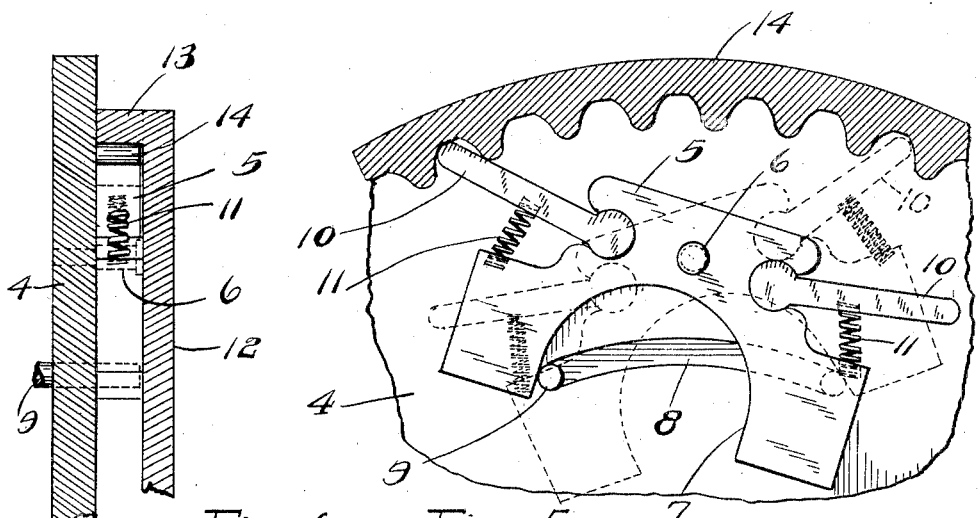
*Fig. 6.*   *Fig. 5.*
INVENTOR.
John C Bogart.
BY Edward R. Monroe.
ATTORNEY.

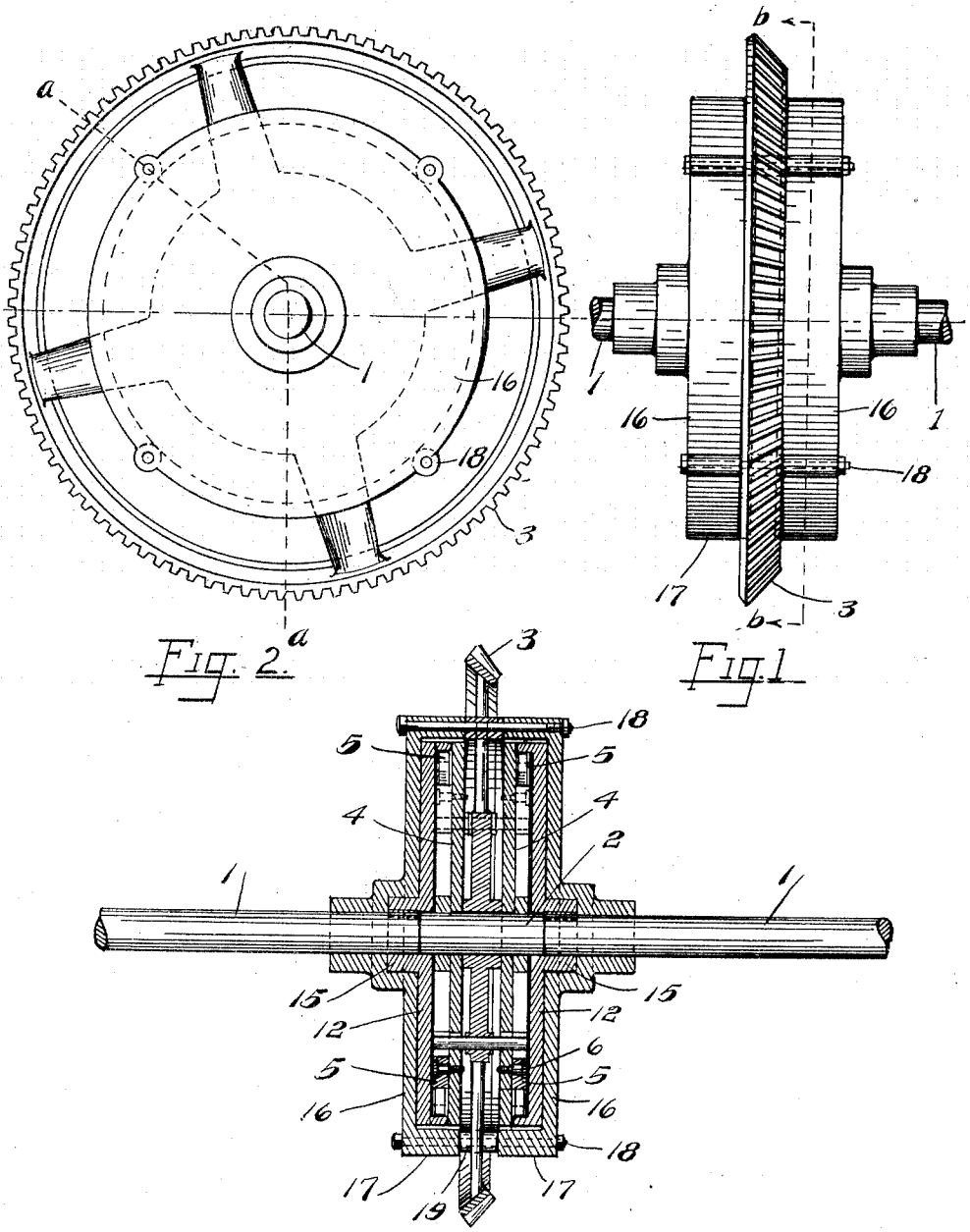

UNITED STATES PATENT OFFICE.

JOHN C. BOGART, OF BAY CITY, MICHIGAN, ASSIGNOR OF ONE-HALF TO PAUL R. DINSMORE, OF BAY CITY, MICHIGAN.

DIFFERENTIAL GEARING.

1,372,993.   Specification of Letters Patent.   Patented Mar. 29, 1921.

Application filed November 6, 1917, Serial No. 200,544. Renewed August 19, 1920. Serial No. 404,717.

*To all whom it may concern:*

Be it known that I, JOHN C. BOGART, a citizen of the United States of America, residing at Bay City, in the county of Bay and State of Michigan, have invented certain new and useful Improvements in Differential Gearing, of which the following is a specification.

The invention relates to drive gearing for motor vehicles and more particularly to the differential, which provides for one drive wheel traveling at a different speed from the opposite drive wheel.

The invention has for its object to impart a positive movement to both drive wheels and yet admit of the outer wheel traveling faster than the inner wheel when turning a corner.

For a full understanding of the invention and the merits thereof, reference is to be had to the following description and the drawings hereto attached, in which—

Figure 1 is a front view of a differential gearing embodying the invention;

Fig. 2 is a side view thereof;

Fig. 3 is a section on the line *a—a* of Fig. 2;

Fig. 4 is a section on the line *b—b* of Fig. 1 looking to the left;

Fig. 5 is a detail view showing the parts on a larger scale;

Fig. 6 is a sectional detail.

Corresponding and like parts are referred to in the following description and indicated in the several views of the drawings by like reference characters.

The numeral 1 designates the drive shafts of the drive axle of a motor vehicle. A short shaft 2 is in line with the drive shafts 1 and receives a drive gear 3 which is supported thereon. The drive gear 3 may be of any type commonly employed in differential gearing and is adapted to receive the driving force of the motor through suitable power transmitting means well understood in the art and not deemed necessary to be illustrated in the present instance. A disk or plate 4 is disposed at each side of the drive gear 3 and is loose upon the short shaft 2. One or more yokes 5 are pivoted to each of the disks 4 by means of a suitable pivot fastening 6. A recess 7 is formed in the inner edge of each of the yokes 5 and is of semi-circular form. Arcuate slots 8 are formed in the disks 4, one for each of the yokes 5. One or more pins 9 carried by the drive wheel 3 project laterally therefrom and pass through the arcuate slots 8. The pins 9 engage opposite members of the yoke 5 and cause such yokes to rock on their pivot supports 6. Dogs 10 are pivotally connected to opposite ends of each of the yokes 5 and are disposed equi-distant from the pivot supports of the yokes and extend in opposite directions. Expansible helical springs 11 interposed between the dogs 10 and adjacent ends of the yokes normally hold the dogs in a given position and admit of the dogs yielding so that one ratchet element may travel faster than the remaining ratchet element when the vehicle is turning a corner.

A ratchet element is located exterior to each of the disks or plates 4 and is secured to a drive shaft 1 so as to rotate therewith. Each of these ratchet elements comprises a plate or disk 12 formed at its outer edge with a lateral flange 13 which is internally toothed, as indicated at 14. Each of the plates or disks 12 is formed at its center with a hub 15 which receives the contiguous ends of the shafts 1 and 2 thereby holding the same in line, the said hub 15 being secured in any manner to the adjacent shaft 1. The internally toothed flange 13 faces inward to be engaged by the outer ends of the dogs 10. The drive gear 3 comprises a center portion, a rim portion and intermediate connecting spokes.

A suitable housing incloses the center portion of the drive gear, the disks or plates 4, the ratchet elements at the outer sides of the disks 4 and the parts mounted upon the plates or disks 4. This housing comprises two parts, each consisting of a plate or disk 16 having a hub to receive a shaft 1 and provided at its outer edge with an inwardly extending rim or flange 17. Bolts, or fastenings 18 connect the parts of the housing and receive spacers 19 which prevent binding of the drive gear and admit of the same turning freely.

It will be understood from the foregoing, taken in connection with the accompanying drawings, that the invention provides a differential gearing which admits of both drive wheels being positively driven thereby preventing either one of the drive wheels remaining stationary and the other turning as is the case with differential gearing as generally constructed and which is prolific of skidding. While both drive wheels are positively rotated, nevertheless the drive wheel describing the larger circle may rotate faster than the drive wheel describing the smaller circle when the vehicle is making a turn. When power is applied to the drive gear 3 to rotate the same in an anti-clockwise direction the parts assume the relative position indicated by the full lines in Fig. 5, the pin 9 moving to the left hand end of the slot 8 and rocking the yoke 5 to throw the left hand dog 10 into engagement with the teeth 14 of the ratchet elements attached to the drive shaft 1 thereby causing both drive shafts to rotate with the drive gear. When the drive gear 3 is rotated in a clockwise direction the parts assume the relative position indicated by the dotted lines in Fig. 5, the pin 9 moving to the right hand end of the slot 8 and rocking the yoke to throw the right hand dog into engagement with the teeth 14 of the ratchet elements. It will be observed that while the dogs 10 are held in engagement with the teeth 14, nevertheless ample provision is had for yielding of such dogs to admit of one or the other of the ratchet elements rotating faster than the remaining gear element so that the drive wheel describing the larger circle may rotate faster than the inner drive wheel describing the smaller circle.

What I claim is:

1. In differential gearing, the combination of a drive gear, ratchet elements at the sides of the drive gear, yokes pivotally mounted between the drive gear and the ratchet elements and having spaced sides, oppositely disposed dogs mounted in pairs upon each of the yokes and extending outwardly therefrom when in its engaging position, and means carried by the drive gear and operating between the spaced sides of the yoke and having a limited movement to rock the yokes and throw one or the other of the dogs carried thereby into operative engagement with the ratchet elements.

2. In differential gearing, the combination of a drive gear, ratchet elements at the sides thereof and having peripheral teeth, yokes pivotally supported between the drive gear of the side ratchet elements and arranged within the peripheral teeth of the latter, oppositely disposed dogs pivotally mounted upon each of the yokes and extending outwardly therefrom to the said peripheral teeth when in engaging position, and means projecting from opposite sides of the drive gear and extending into the path of the yokes and operating between the sides thereof to rock the yokes and throw one or the other of the dogs thereof into operative engagement with the ratchet elements.

3. A differential gearing, comprising ratchet elements, an intermediate drive gear supporting member at the sides of the drive gear and between it and the ratchet elements, yokes pivotally mounted upon the supporting members, oppositely disposed dogs on each of the yokes and a pin carried by the drive gear and extending across the path of the supporting members into the path of the yokes and operating between the spaced sides thereof to rock the yokes and throw one or the other of the dogs carried thereby into operative engagement with the ratchet elements, the latter being provided beyond the dogs with internal teeth for engagement with the dogs.

4. A differential gearing comprising ratchet elements, an intermediate drive gear, plates loosely mounted between the drive gear and ratchet elements and formed with arcuate slots, yokes pivotally mounted at the outer portion upon the outer sides of the plates and having inwardly extending sides, oppositely disposed dogs on each of the yokes, and a pin carried by the drive gear and extending through the slots of the plates and adapted to engage the yokes between the sides thereof to rock the said yokes and throw one or the other of the dogs carried thereby into operative engagement with the ratchet elements.

5. In differential drive gearing, the combination of oppositely disposed drive shafts, an intermediate short shaft, a drive gear mounted upon the short shaft, plates at the sides of the drive gear and loosely mounted on the said short shaft and formed with arcuate slots, ratchet elements at the outer sides of the plates and provided with hubs which receive the adjacent ends of the short drive shafts and secured to the latter, yokes pivotally mounted on the plates, oppositely disposed dogs on each of the yokes, and a pin carried by the drive gear and passing through the slots of the plates and extending across the path of the yokes to rock the latter and throw one or the other of the dogs carried thereby into operative engagement with the ratchet elements.

6. In differential drive gearing, the combination of oppositely disposed drive shafts, an intermediate short shaft, a drive gear mounted upon the short shaft, plates at the sides of the drive gear and loosely mounted on the said short shaft and formed with arcuate slots, ratchet elements at the outer sides of the plates and provided with hubs which receive the adjacent ends of the short drive shafts and secured to the latter, yokes pivotally mounted on the plates, oppositely disposed dogs on each of the yokes, a pin carried by the drive gear and passing through the slots of the plates and extending across the path of the yokes to rock the latter and throw one or the other of the dogs carried thereby into operative engagement with the ratchet elements, a housing inclosing the several parts and comprising like members mounted upon the drive shafts, fastenings connecting the parts of the housing, and spacing means to prevent binding of the parts between the members of the housing.

In testimony whereof I affix my signature.
JOHN C. BOGART.